United States Patent [19]
Ritchie et al.

[11] Patent Number: 5,743,995
[45] Date of Patent: Apr. 28, 1998

[54] APPARATUS FOR THERMALLY ATTACHING AN ELEMENT TO A MOUNTING SURFACE

[75] Inventors: Shawn W. Ritchie; Michael Leroy Koelsch, both of Rochester; Charles Edward Young, Williamson, all of N.Y.

[73] Assignee: Eastman Kodak Company, Rochester, N.Y.

[21] Appl. No.: 744,783

[22] Filed: Nov. 6, 1996

Related U.S. Application Data

[62] Division of Ser. No. 440,802, May 15, 1995, Pat. No. 5,622,591.

[51] Int. Cl.$^6$ .................................................. B32B 31/00
[52] U.S. Cl. .................... 156/499; 156/493; 156/583.1; 156/583.3
[58] Field of Search ................................ 156/493, 499, 156/583.1, 583.3, 320, 322, 293, 211, 308.2, 309.9

[56] References Cited

U.S. PATENT DOCUMENTS

| | | |
|---|---|---|
| 3,475,250 | 10/1969 | Scalora . |
| 3,714,770 | 2/1973 | Rothke . |
| 3,787,945 | 1/1974 | Pasek et al. . |
| 3,879,980 | 4/1975 | King, Jr. . |
| 4,300,275 | 11/1981 | McLaughlin . |
| 4,320,568 | 3/1982 | Herrod et al. . |
| 4,541,891 | 9/1985 | Leatherman . |
| 4,874,454 | 10/1989 | Talalay et al. ............... 156/583.3 X |
| 4,875,270 | 10/1989 | Krips et al. . |
| 4,980,008 | 12/1990 | Woods et al. ............... 156/583.3 X |
| 5,223,189 | 6/1993 | Friedrich . |

FOREIGN PATENT DOCUMENTS

| | | |
|---|---|---|
| 1160699 | 1/1964 | Germany . |
| 3426246 | 1/1986 | Germany . |
| 4-231123 | 8/1992 | Japan . |

OTHER PUBLICATIONS

"Firestone Airpicker Airgripper", Firestone Industrial Products Company, Copyright 1993.

"Presray Pneuma–Seal, Seals & Custom Rubber Fabrications", Bulletin S–91, The Presray Corp., Pawling, NY 12564, Copyrght 1991.

*Primary Examiner*—Jeff H. Aftergut
*Attorney, Agent, or Firm*—Mark G. Bocchetti

[57] ABSTRACT

An apparatus for thermally attaching includes a thermally conductive support body (36; 86) with an edge surface (38; 88), a heater cartridge (42), a pneumatically expandable elastomeric element (44–54; 92–102), pinch plates (64, 66; 112, 114) for holding the elastomeric element in place, and passages (60, 62; 108, 110) for pressurizing the heated elastomeric element into contact with an element (24, 26) to be thermally attached to a mounting surface (85).

13 Claims, 4 Drawing Sheets

APPARATUS FOR THERMALLY ATTACHING AN ELEMENT TO A MOUNTING SURFACE

This is a Divisional of U.S. application Ser. No. 08/440,802 filed 15 May 1995, now U.S. Pat. No. 5,622,591.

DESCRIPTION

1. Technical Field

The invention concerns apparatus and methods for thermally attaching or joining elements of an article of manufacture. More particularly, the invention concerns such apparatus and methods which are suited for thermally attaching one element to an inside or outside diameter or other mounting surface of another element or article.

2. Background Art

In various industrial applications, it is necessary to attach or join one element to another. Aside from typical mechanical fasteners such as clips, screws, rivets and the like, various types of adhesives have been used, such as contact adhesives and thermally activated adhesives. For example, in some types of packages, such as those used for photographic products like paper and film, a roll of the product has been provided with opaque end disks to prevent light from reaching the edges of a strip of paper or film forming the roll. Various types of mechanical apparatus have been known for thermally attaching the end disks to the inside diameter of a core on which the roll has been wound. Such mechanical apparatus generally have been rather complex and difficult to use and maintain. Also, mechanical apparatus have tended to leave small gaps which result in the end disks not being properly attached. In other applications, thermal attachments have been made to an outside diameter of an article, using other, similarly complex apparatus. Thus, a need has existed for a more simple, yet reliable technique for thermally attaching one element around an inside or outside diameter of another element.

SUMMARY OF THE INVENTION

A primary objective of our invention is to provide a simple, effective apparatus and method for thermally attaching an element to a mounting surface.

Another objective is to provide such an apparatus and method which will ensure uniform contact and attachment of the element along the mounting surface.

Yet another objective is to provide such an apparatus which has few operating parts and is easy to service.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

The apparatus of our invention is particularly suited for thermally attaching along a mounting surface of an article, such as an inside surface of a core for a roll of web material. The apparatus includes a thermally conductive support body having an edge surface; a heater element operatively associated with the support body for heating the body at least at the edge surface; a pneumatically expandable elastomeric element mounted to the support body along the edge surface; and means for directing pressurized gas to the elastomeric element to expand the elastomeric element away from the edge surface, whereby upon actuation of the heater element, the elastomeric element is heated to a temperature suitable for attaching; and upon introduction of pressurized gas, the heated elastomeric element expands to permit contact with the mounting surface.

The edge surface may be an outside diameter of the support body and the elastomeric element may expand radially outwardly. Alternatively, the edge surface may be an inside diameter of the support body and the elastomeric element may expand radially inwardly. The support body may be essentially cylindrical and the heater element may be mounted centrally of the support body. Means may be included for clamping the elastomeric element to the support body. Means may be included for controlling movement of the elastomeric element upon introduction of pressurized gas. When the support body includes an inside or outside cylindrical surface defining the edge surface; the elastomeric element may include a peripheral engagement surface opposite the edge surface and a pair of side walls extended radially along the support body, the side walls being compressed against the support body. Each side wall may comprise a bead; and the support body and the pinch members may have grooves to engage the beads. The means for directing pressurized gas may comprise at least one groove in the edge surface; and at least one passage through the support body to the groove. Means may be provided for applying vacuum between the elastomeric element and the support body to retract the elastomeric element from contact with the mounting surface into contact with the edge surface of the support body, whereby the elastomeric member is reheated.

The method of our invention is useful for thermally attaching an element at a mounting surface of an article and may include steps of providing a thermally conductive support body having an edge surface; operatively associating a heater element with the support body for heating the body at least at the edge surface; mounting a pneumatically expandable elastomeric element to the support body along the edge surface; actuating the heater element to heat the support body and the elastomeric element to a temperature suitable for attaching; positioning an element to be thermally attached at the mounting surface of the article; positioning the elastomeric element opposite the element to be attached; and directing pressurized gas to the heated elastomeric element to expand the elastomeric element away from the support body into contact with the element to be attached, whereby the heated elastomeric element contacts the element to be attached and presses the element to be attached against the mounting surface of the article to thermally attach the element to the article. When the edge surface is an outside diameter of the support body, the elastomeric element expands radially outwardly. When the edge surface is an inside diameter of the support body, the elastomeric element expands radially inwardly. The method may include applying vacuum between the elastomeric element and the support body to retract the elastomeric element from contact with the mounting surface into contact with the edge surface of the support body, whereby the elastomeric member is reheated. Alternatively, the method may include releasing pressure between the elastomeric element and the support body to retract the elastomeric element from contact with the mounting surface into contact with the edge surface of the support body, whereby the elastomeric member is reheated.

Our invention provides various advantages. Elements such as end disks for rolls of web material can be attached reliably and uniformly. The apparatus is simple and easy to maintain. The apparatus can be adapted to thermally attach elements to a variety of inside or outside surfaces of an article. The elastomeric element conforms rather readily to minor surface irregularities to help provide good attachment and leaves no gaps along the line of attachment to the mounting surface.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
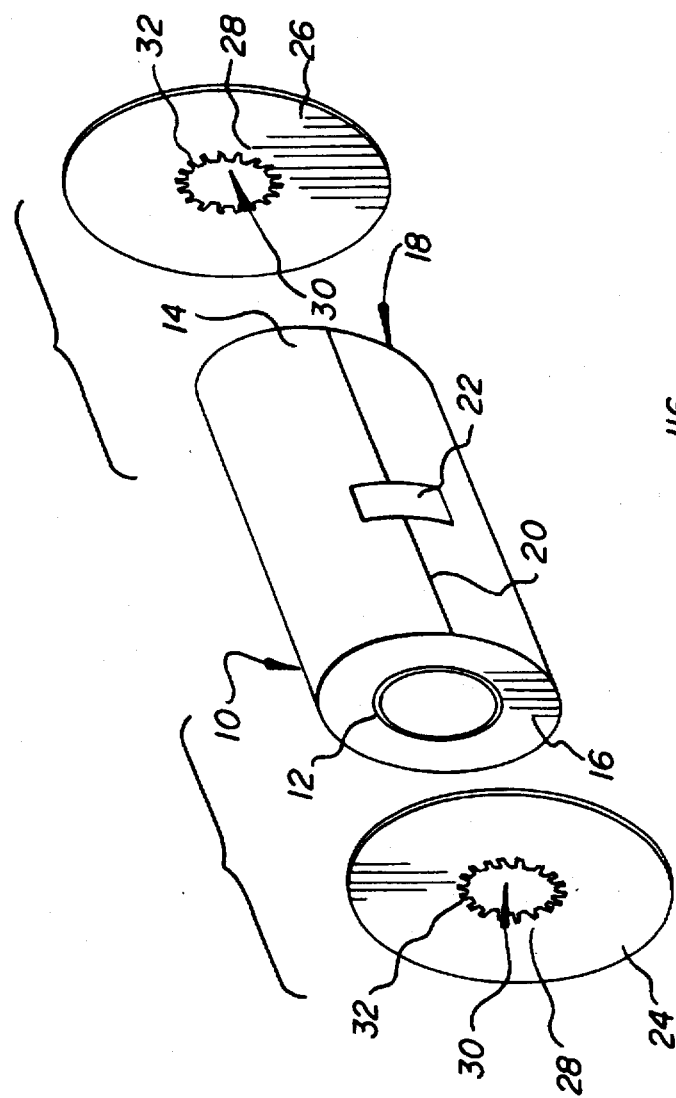
FIG. 1 shows an exploded view of a known article of manufacture which can be assembled, in part, using the method and apparatus of the invention.

The following is a detailed description of the preferred embodiments of the invention, reference being made to the drawings in which the same reference numerals identify the same elements of structure in each of the several Figures.

FIG. 1 shows a known article of manufacture which can be assembled using our invention. A wound roll 10 of light-sensitive web material includes a central, typically flangeless, hollow core 12 having opposite ends and a length approximately equal to the width of a length 14 of such web material. Typically, the bore of core 12 is essentially right circular cylindrical in shape; however, those skilled in the art will appreciate that our invention also can be used to make thermal attachments to inside mounting surfaces of other shapes. Length 14 is wound onto core 12; so that, in the familiar manner, the wound roll 10 has opposite end surfaces 16, 18. A leading end 20 of length 14 is held in place by a strip of tape 22. A pair of flexible end disks 24, 26 cover end surfaces 16, 18. Each disk includes a central portion 28 with a hole 30 somewhat smaller in diameter than an internal diameter of core 12. The end disks are made from a thin, flexible, opaque material. A plurality of radial cuts 32 extend outwardly from hole 30 through the thickness of the disk, to define a corresponding plurality of tabs which can be folded into the central bore of core 12. To facilitate attachment of the tabs within the core, the tabs, the core or both typically are coated with a thermally activated adhesive.

End disks 24, 26 may be made from a material such as a lamination including an outer layer of 0.025 mm thick, white, opaque, high density polyethylene-low density polyethylene blend extrudate; a second layer of 0.076 mm thick linear low density polyethylene film containing carbon black; and a third layer comprising a coextrusion of 4 pound ethylene vinyl acetate and 16 pound Surlyn extrudate, approximately 0.032 mm thick. In use, the inner layer would face roll 10. Other suitable materials for end disks 24, 26 include any suitable plastic film or lamination which could include high density polyethylene, polypropylene, Cellophane, Nylon, polyester and various combinations thereof. For use with light-sensitive web materials, the end disks, of course, must also be opaque.

Figure 2:
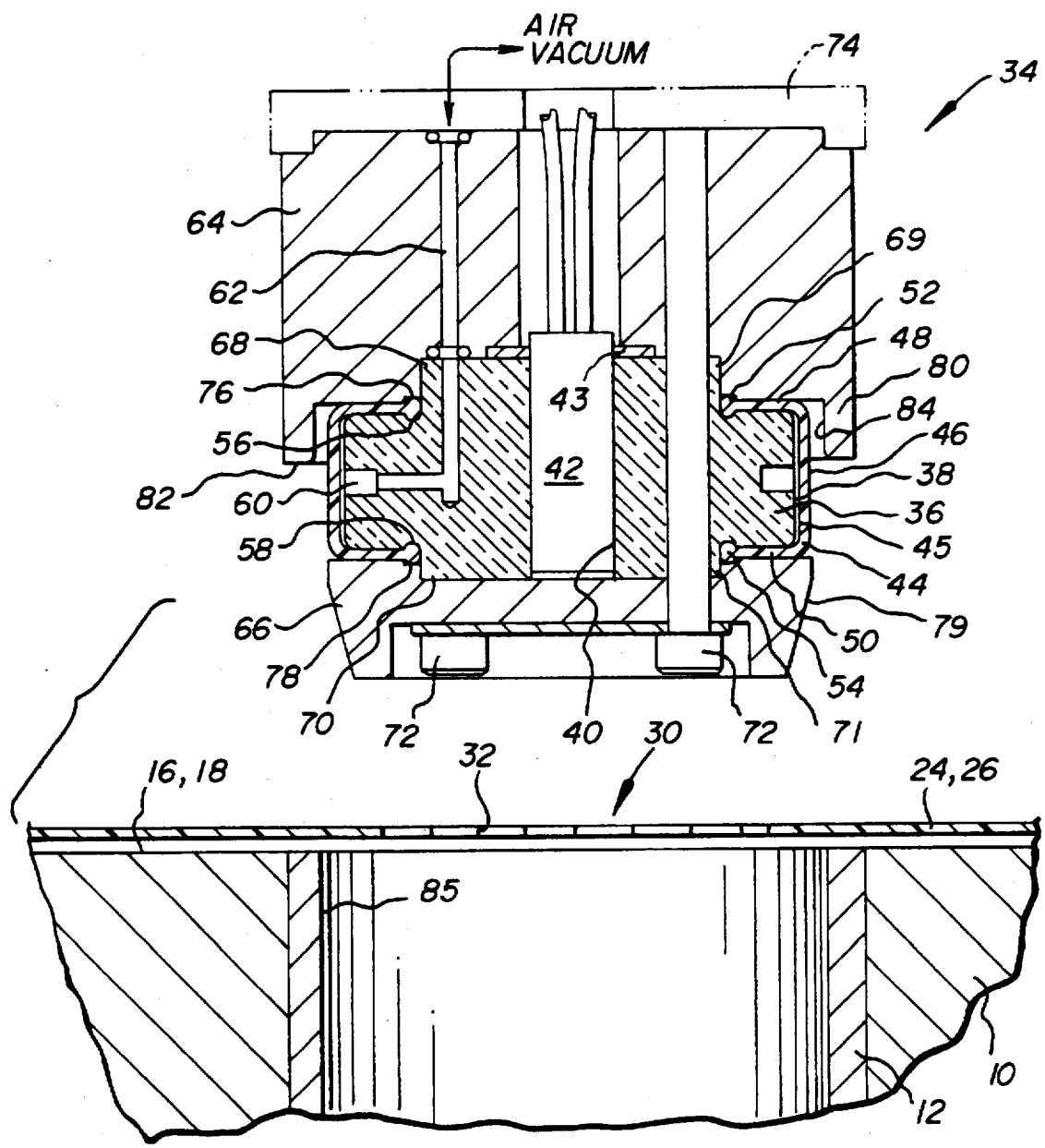
FIG. 2 shows a centerline sectional elevation view of our apparatus positioned prior to insertion into the core of a roll of web material to thermally attach an end disk.

FIG. 2 shows an apparatus 34 according to our invention, positioned opposite a roll 10 on which an end disk has been placed opposite one end surface. A central, thermally conductive support body 36 is made from copper, aluminum or other highly thermally conductive material and includes a circumferential edge surface 38. Support body 36 and edge surface 38 have essentially right circular cylindrical geometry in the illustrated embodiment; however, those skilled in the art will appreciate that the geometry may be adjusted as appropriate for a mounting surface defined by the interior geometry of core 12. For example, a right elliptical cylindrical geometry could be used for some applications. A central bore 40 receives a cartridge heater 42 having a radially extending mounting flange 43 which bears against an end surface of body 36. Heater 42 is mounted centrally in body 36 to ensure that the body will be warmed essentially uniformly at edge surface 38. For a support body and pinch plates of the types described in the following paragraphs, heater cartridge 42 had a length of about 1.5 inch (38.1 mm) and a power rating of 150 watts at 120 volts.

Mounted on body 36 is a pneumatically expandable, elastomeric element 44 having a peripheral wall 45 with a peripheral engagement surface 46 facing outwardly opposite edge surface 38. As illustrated, elastomeric element 44 rather resembles a tire for a wheel and includes a pair of radially extended side walls 48, 50 which extend inwardly along support body 36. The side walls comprise respective circumferentially and axially extended attachment beads 52, 54 which extend axially inward and outward from the side walls. The beads engage respective circumferentially extended grooves 56, 58 provided in end surfaces of support body 36. In one actual embodiment, elastomeric element 44 was made from a reinforced silicone rubber. Any suitable elastomeric material may be used which will withstand the applied pressure and temperature and will transmit sufficient heat to the end disk or other element being attached. Element 44 had an outer diameter of about 2.75 inch (69.9 mm), an inside diameter at beads 52, 54 of about 2.3 inch (58.4 mm), an axial length across edge surface of about 0.75 inch (19.1 mm), and a wall thickness outboard of the beads of about 0.090 inch (2.29 mm). Other suitable elastomeric materials may be used, such as Neoprene, fluorosilicone rubber, natural rubber, butyl rubber, polyurethane, and the like. Reinforcing fabric or cord also may be used. A circumferentially extended groove 60 is provided in edge surface 38 opposite wall 45. Means are provided for directing pressurized gas into elastomeric element 44. A passage 62 is extended through the support body to groove 60, to permit pressurization or evacuation of a volume between support body 36 and elastomeric element 44, in a manner to be described subsequently in this specification.

Means are provided for clamping elastomeric element 44 in place on support body 36, in the form of a pair of pinch plates or members 64, 66. Support body 36 includes a pair of axially extended bosses 68, 70 which extend into corresponding bores 69, 71 in the pinch plates. A plurality of bolts 72 secure the assembly of support body 36, elastomeric element 44, and pinch plates 64, 66 to a support plate 74, shown in dashed lines, of an associated actuator, not illustrated. To further secure elastomeric element 44, the pinch plates include a pair of respective circumferentially extended grooves 76, 78 which also engage attachment beads 52, 54. To reduce heat loss from support body 36, the pinch plates preferably are molded or machined from a thermally insulating material such as Peek (registered trademark of the DuPont Company), Vespel (registered trademark of the DuPont Company), phenolic plastic, ceramic, and the like. Pinch plate 66 is provided with a tapered circumferential surface 79 to facilitate smooth engagement with the end disk and insertion into core 12. Means are provided for controlling movement of the elastomeric element upon pressurization. Pinch plate 64 is provided with a circumferentially and axially extended engagement land 80 having an axial stop surface 82 for engaging the end edge of core 12 and a radial stop surface 84 for limiting outward movement of elastomeric element 44 when inflated.

Figure 3:
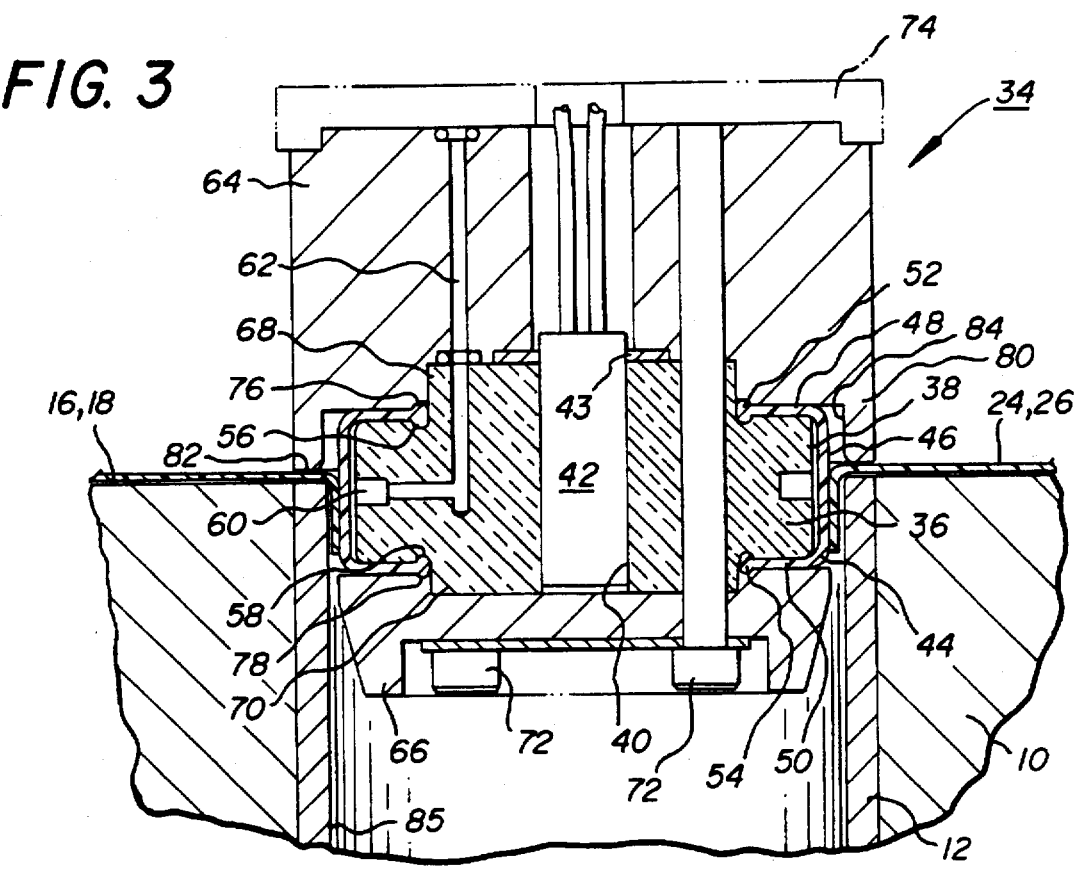
FIG. 3 shows a centerline sectional view of our apparatus as inserted inside a core, in its uninflated state.
Figure 4:
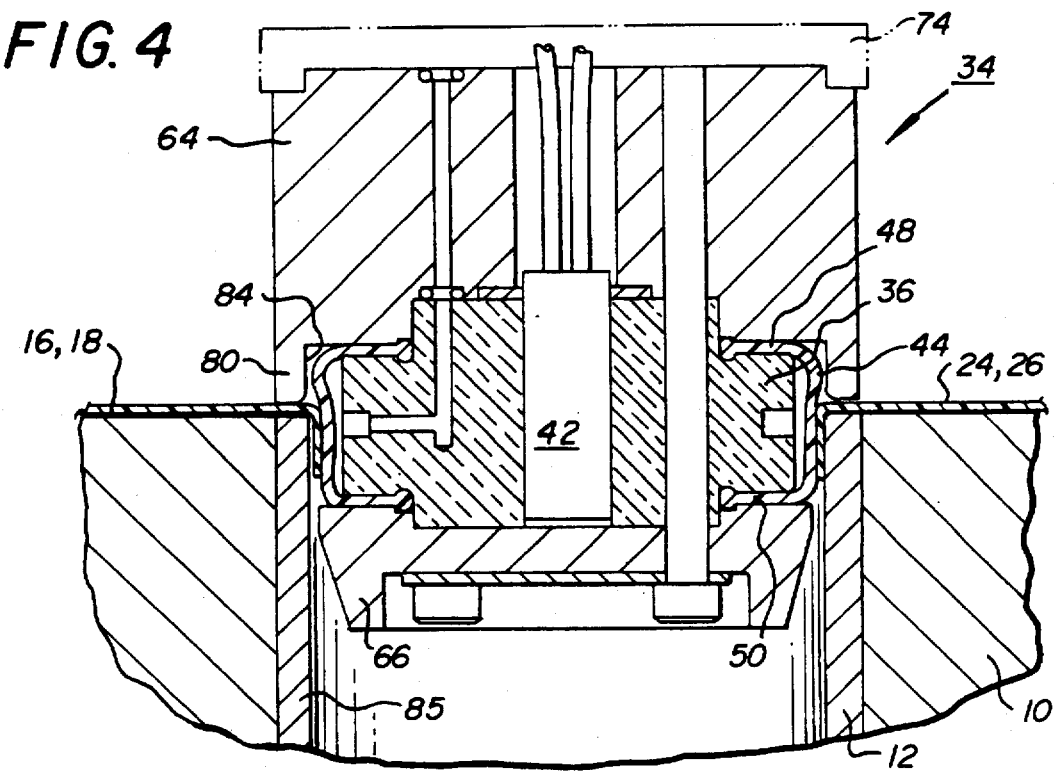
FIG. 4 shows a centerline sectional view of our apparatus as inserted inside a core, in its inflated state.
Figure 5:
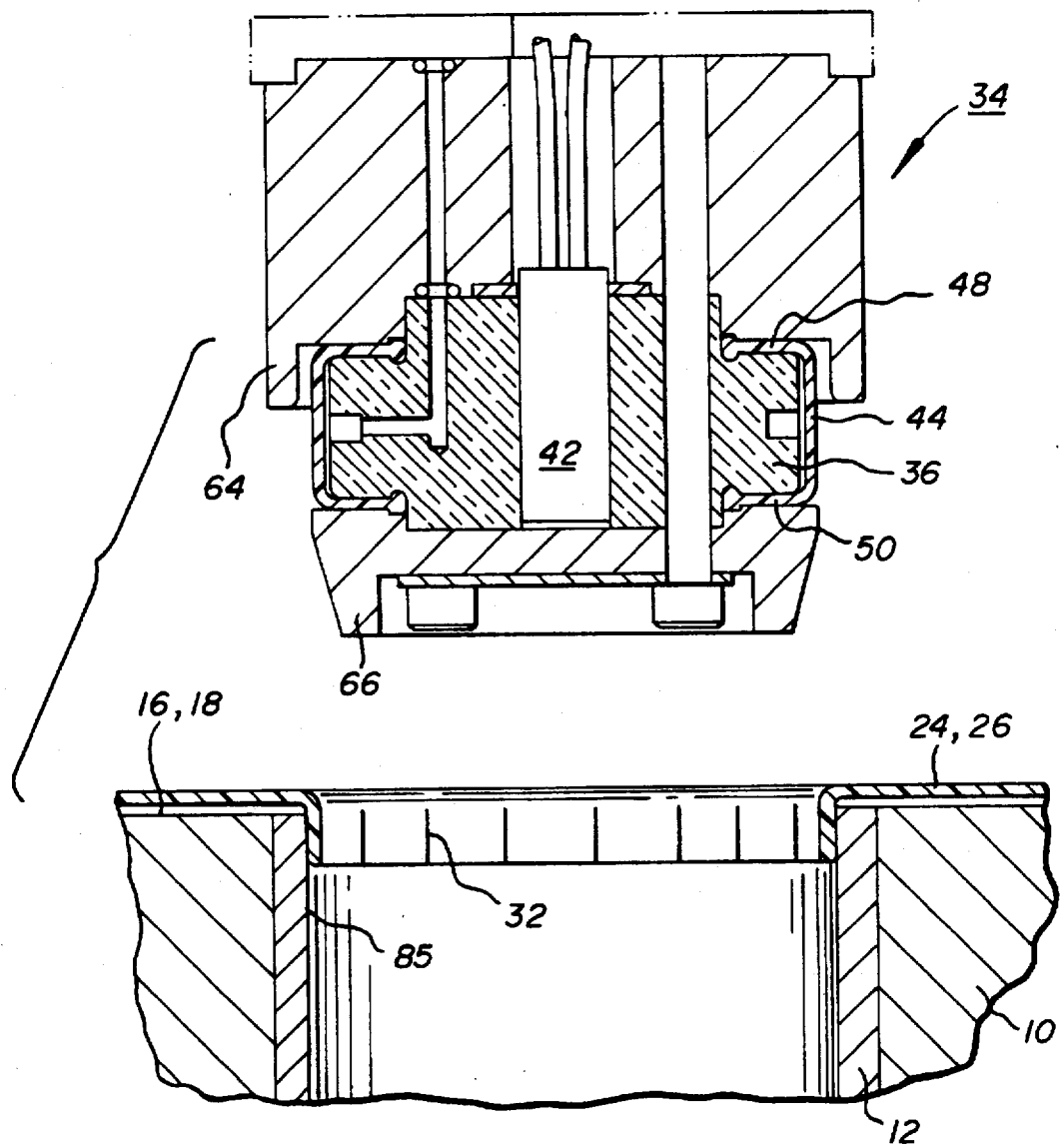
FIG. 5 shows a centerline sectional elevation view of our apparatus positioned after removal from the core of a roll of web material after thermally attaching an end disk.

In use of the apparatus, roll 10 is held with the axis of core 12 essentially vertical by any suitable fixture, not illustrated. An end disk is placed on the end surface of the roll, with opening 30 centered over the core. Passage 62 is vented to atmosphere or connected to a source of soft vacuum, to allow elastomeric element 44 to move close to edge surface 38. Heater cartridge 42 is actuated to warm support body 36 and thereby heat elastomeric element 44 to a temperature suitable for thermally attaching the end disk. For typical thermally activated adhesives, at least peripheral engagement surface 46 should have a temperature in the range of 250° to 290° F., just before positioning in core 12. Apparatus 34 is then lowered into core 12; so that, tapered surface 79 folds the tabs surrounding hole 30 into the core, to the position of FIG. 3. Axial stop surface 82 abuts the end surface of core 12. Pressurized air is then directed into passage 62 to cause elastomeric element 44 to expand away from edge surface 38, contact the taps surrounding hole 30 and press them against a mounting surface 85 defined by the inside surface of core 12, as shown in FIG. 4. Radial stop surface 84 prevents over expansion of elastomeric element 44. Due to the temperature of the elastomeric element, thermally activated adhesive on the end disk or on surface 85, or both, causes the end disks to be thermally attached to the core. Those skilled in the art will appreciate that our apparatus also could be used to attach an element to a mounting surface without adhesive, if the materials of the element or the surface become sufficiently sticky when subjected to the heated elastomeric element. To prevent accumulation of adhesive or dirt on the elastomeric element, a strip of thin polytetrafluoroethylene tape, not illustrated, may be wrapped around the outside of engagement surface 46. After a period of about 1 to 4 seconds, pressure on passage 62 is released and apparatus 34 is withdrawn to the position of FIG. 5, ready for the next cycle of operation. To ensure that the elastomeric element is promptly reheated to the desired temperature, vacuum may be applied to passage 62 to drawn peripheral wall 45 into good contact with edge surface 38.

Figure 6:
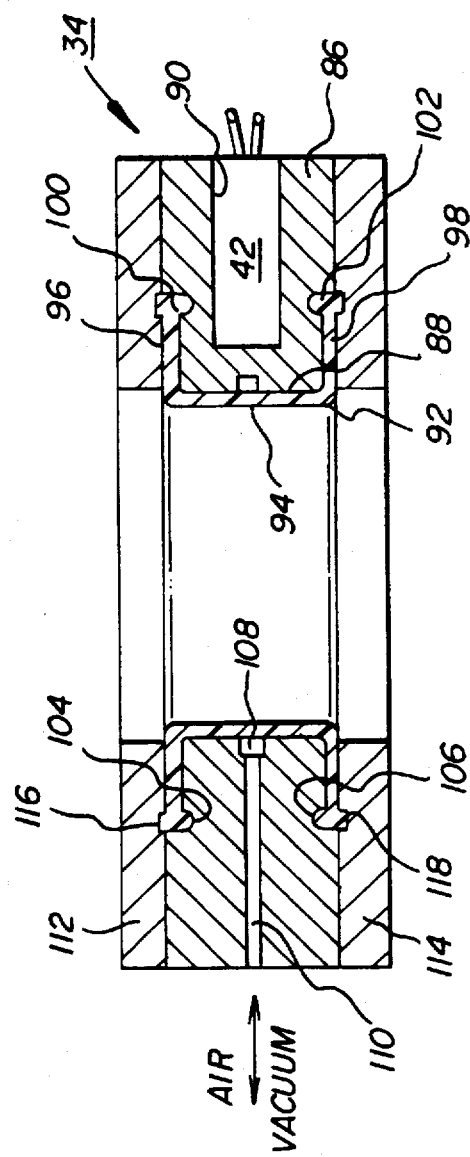
FIG. 6 shows a centerline sectional elevation view of an alternative embodiment of our apparatus.

FIG. 6 illustrates an alternative embodiment of our invention which is useful to attaching elements to outside peripheral mounting surfaces. An annular thermally conductive support body 86 has an inside circumferential edge surface 88. A plurality of symmetrically, circumferentially located radial bores 90, only one being shown, are provided for a corresponding plurality of heater cartridges 42. A pneumatically expandable elastomeric element 92, which is essentially an inside-out version of elastomeric element 44, includes an inside peripheral engagement surface 94 and a pair of radially outwardly extended side walls with beads 100, 102. Grooves 104, 106 in support body 86 engage the beads. A circumferential groove 108 in edge surface 88 is connected with a radial passage 110. A pair of annular pinch plates 112, 114 are provided with circumferential grooves 116, 118 for engaging beads 100, 102. Suitable fasteners, not illustrated, join the assembly. Those skilled in the art will appreciate that in use, elastomeric element 92 expands radially inwardly, thus permitting thermal attachment of elements to essentially cylindrical mounting surfaces, not illustrated, located inside element 92.

Parts List

10 . . . roll of web of light-sensitive material
12 . . . core with opposite ends and length
14 . . . length of web on core, width equal to length of core
16, 18 . . . opposite end surfaces of roll as-wound
20 . . . leading end of 14
22 . . . strip of tape
24, 26 . . . flexible, opaque end disks
28 . . . central portion of 24, 26
30 . . . central hole in 24, 26
32 . . . radial cuts defining tabs surrounding 30
34 . . . apparatus of invention
36 . . . thermally conductive support body
38 . . . circumferential edge surface of 36
40 . . . central bore
42 . . . heater element or cartridge
43 . . . mounting flange on 42
44 . . . pneumatically expandable elastomeric element
45 . . . peripheral wall of 44
46 . . . peripheral engagement surface
48, 50 . . . side walls
52, 54 . . . beads on 48, 50
56, 58 . . . grooves in 36 to receive 52, 54
60 . . . circumferential groove in 38
62 . . . passage through 36 to 60
64, 66 . . . pinch plates or members
68, 70 . . . axially extended bosses on 36
67, 71 . . . bores in 64, 66
72 . . . bolts
74 . . . support plate of associated actuator
76, 78 . . . grooves in 64, 66 to receive 52, 54
79 . . . tapered circumferential surface on 66
80 . . . circumferential axial engagement land
82 . . . axial stop surface
84 . . . radial stop surface on 80
85 . . . mounting surface on inside of 12
86 . . . annular thermally conductive support body
88 . . . inside circumferential edge surface of 86
90 . . . radial bore for 42
92 . . . pneumatically expandable elastomeric element
94 . . . inside peripheral engagement surface
96, 98 . . . side walls
100, 102 . . . beads on 96, 98
104, 106 . . . grooves in 86 to receive 100, 102
108 . . . inside circumferential groove in 94
110 . . . passage
112, 114 . . . annular pinch plates or members
116, 118 . . . grooves in 112, 114 to receive 100, 102

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. Apparatus for thermally attaching along a mounting surface of an article, comprising:
   a thermally conductive support body having an edge surface;
   a heater element operatively associated with the support body for heating the body at least at the edge surface;
   a pneumatically expandable elastomeric element mounted to the support body along the edge surface; and
   means for directing pressurized gas to the elastomeric element to expand the elastomeric element away from the edge surface,
   whereby upon actuation of the heater element, the elastomeric element is heated to a temperature suitable for attaching; and upon introduction of pressurized gas, the heated elastomeric element expands to permit contact with the mounting surface.

2. Apparatus according to claim 1, wherein the edge surface is an outside diameter of the support body and the elastomeric element expands radially outwardly.

3. Apparatus according to claim 1, wherein the edge surface is an inside diameter of the support body and the elastomeric element expands radially inwardly.

4. Apparatus according to claim 1, wherein the support body is essentially cylindrical and the heater element is mounted centrally of the support body.

5. Apparatus according to claim 1, further comprising means for clamping the elastomeric element to the support body.

6. Apparatus according to claim 1, further comprising means for controlling movement of the elastomeric element upon introduction of pressurized gas.

7. Apparatus according to claim 5, wherein the support body includes a cylindrical surface defining the edge surface; the elastomeric element comprises a peripheral engagement surface opposite the edge surface and a pair of side walls extended radially along the support body; and the means for clamping comprises first and second pinch members, each compressing one of the side walls against the support body.

8. Apparatus according to claim 6, wherein the support body includes a cylindrical surface defining the edge surface; the elastomeric element comprises a peripheral engagement surface opposite the edge surface and a pair of side walls extended radially along the support body; and the means for clamping comprises first and second pinch members, each compressing one of the side walls against the support body.

9. Apparatus according to claim 7, wherein each side wall comprises a bead; and the support body and the pinch members have grooves to engage the beads.

10. Apparatus according to claim 7, wherein the cylindrical surface is an outside surface.

11. Apparatus according to claim 7, wherein the cylindrical surface is an inside surface.

12. Apparatus according to claim 1, wherein the means for directing pressurized gas comprises at least one groove in the edge surface; and at least one passage through the support body to the groove.

13. Apparatus according to claim 1, further comprising means for applying vacuum between the elastomeric element and the support body to retract the elastomeric element from contact with the mounting surface into contact with the edge surface of the support body, whereby the elastomeric member is reheated.

* * * * *